(12) United States Patent
Qin et al.

(10) Patent No.: US 11,234,148 B2
(45) Date of Patent: Jan. 25, 2022

(54) COMMUNICATION METHOD, BASE STATION, AND TERMINAL DEVICE

(71) Applicant: HUAWEI TECHNOLOGIES CO., LTD., Guangdong (CN)

(72) Inventors: Yi Qin, Kista (SE); Zhongfeng Li, Munich (DE); Hua Li, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 98 days.

(21) Appl. No.: 16/368,724

(22) Filed: Mar. 28, 2019

(65) Prior Publication Data
US 2019/0223044 A1 Jul. 18, 2019

Related U.S. Application Data

(63) Continuation of application No. PCT/CN2017/103755, filed on Sep. 27, 2017.

(30) Foreign Application Priority Data

Sep. 29, 2016 (CN) .......................... 201610864307.5

(51) Int. Cl.
*H04L 5/14* (2006.01)
*H04W 16/14* (2009.01)
(Continued)

(52) U.S. Cl.
CPC ........... *H04W 24/10* (2013.01); *H04L 1/1819* (2013.01); *H04W 56/0005* (2013.01);
(Continued)

(58) Field of Classification Search
CPC . H04W 72/0413; H04W 24/10; H04W 12/00; H04W 76/36; H04W 56/0005;
(Continued)

(56) References Cited

U.S. PATENT DOCUMENTS 9,154,284 B1 10/2015 Park et al.
2005/0070285 A1* 3/2005 Goransson ............ H04W 36/30
455/436
(Continued)

FOREIGN PATENT DOCUMENTS

CN 1894994 A 1/2007
CN 102859896 A 1/2013
(Continued)

OTHER PUBLICATIONS

Asustek: "Beam management in NR", 3GPP DRAFT; R2-165287, vol. RAN WG2, no. Goteborg, Sweden;Aug. 22, 2016-Aug. 26, 2016, Aug. 21, 2016, XP051126865, 4 pages.
(Continued)

*Primary Examiner* — Edan Orgad
*Assistant Examiner* — Vanneilian Lalchinthang
(74) *Attorney, Agent, or Firm* — Womble Bond Dickinson (US) LLP

(57) ABSTRACT

Embodiments of this application provide a communication method, a base station, and a terminal device. The communication method includes: sending, by a base station, first indication information to a terminal device, where the first indication information is used to instruct the terminal device to perform uplink transmission by using at least one configured resource, and the at least one resource includes a resource that is different from a resource currently used by the terminal device; and receiving, by the base station, one or more signals sent by the terminal device by using one or more resources in the at least one resource according to the first indication information.

17 Claims, 6 Drawing Sheets

(51) Int. Cl.
*H04B 7/06* (2006.01)
*H04L 12/26* (2006.01)
*H04W 24/10* (2009.01)
*H04W 72/04* (2009.01)
*H04L 1/18* (2006.01)
*H04W 76/15* (2018.01)
*H04W 56/00* (2009.01)
*H04W 72/08* (2009.01)
*H04W 72/12* (2009.01)

(52) U.S. Cl.
CPC ......... *H04W 72/04* (2013.01); *H04W 72/046* (2013.01); *H04W 72/08* (2013.01); *H04W 72/12* (2013.01); *H04W 76/15* (2018.02)

(58) Field of Classification Search
CPC ... H04W 72/04; H04W 72/042; H04W 16/14; H04W 72/046; H04W 72/08; H04W 72/087; H04W 16/32; H04W 72/12; H04W 72/1231; H04W 76/15; H04W 72/0446; H04W 48/16; H04L 1/1819; H04L 43/16
USPC .......................................... 370/329
See application file for complete search history.

(56) References Cited

U.S. PATENT DOCUMENTS

| | | | |
|---|---|---|---|
| 2011/0171985 A1* | 7/2011 | Papasakellariou | H04W 72/0453 455/509 |
| 2013/0286960 A1* | 10/2013 | Li | H04W 72/042 370/329 |
| 2013/0322396 A1* | 12/2013 | Jiang | H04W 16/14 370/329 |
| 2014/0185481 A1* | 7/2014 | Seol | H04W 52/24 370/252 |
| 2014/0301217 A1* | 10/2014 | Choi | H04L 1/1861 370/252 |
| 2016/0021651 A1* | 1/2016 | Ko | H04L 5/0053 370/329 |
| 2016/0156497 A1* | 6/2016 | Yang | H04B 7/066 370/328 |
| 2016/0204921 A1* | 7/2016 | Kim | H04L 12/189 370/312 |
| 2017/0033854 A1* | 2/2017 | Yoo | H04L 43/08 |
| 2017/0150487 A1* | 5/2017 | Zhou | H04B 7/0626 |
| 2017/0171787 A1* | 6/2017 | Fu | H04W 74/0833 |
| 2017/0222707 A1* | 8/2017 | Chen | H04B 7/0639 |
| 2019/0021085 A1* | 1/2019 | Mochizuki | H04W 52/0203 |

FOREIGN PATENT DOCUMENTS

| | | |
|---|---|---|
| CN | 103875190 A | 6/2014 |
| CN | 104205911 A | 12/2014 |
| CN | 104620551 A | 5/2015 |
| CN | 104734759 A | 6/2015 |
| CN | 105122662 A | 12/2015 |
| CN | 105530036 A | 4/2016 |
| CN | 105556869 A | 5/2016 |
| CN | 105577338 A | 5/2016 |

OTHER PUBLICATIONS

Nokia et al.,"Beam Management Procedures in Beam Based Access",3GPP TSG-RAN WG1#86 R1-167286, Gothenburg, Sweden, Aug. 22-26, 2016,total 5 pages.

* cited by examiner

US 11,234,148 B2

COMMUNICATION METHOD, BASE STATION, AND TERMINAL DEVICE

CROSS-REFERENCE TO RELATED APPLICATIONS

This application is a continuation of International Application No. PCT/CN2017/103755, filed on Sep. 27, 2017, which claims priority to Chinese Patent Application No. 201610864307.5, filed on Sep. 29, 2016. The disclosures of the aforementioned applications are hereby incorporated by reference in their entireties.

TECHNICAL FIELD

Embodiments of this application relate to the communications field, and in particular, to a communication method, a base station, and a terminal device.

BACKGROUND

With development of mobile Internet technologies, communication capacity requirements become increasingly high, and existing frequency band resources cannot satisfy the communication capacity requirements. Therefore, high frequency communication becomes an important research direction of fifth-generation (5th-generation, 5G) wireless communications technologies. In a wireless communications system, especially during high frequency communication, to ensure radio signal coverage, a beamforming technology is required. During high frequency communication, a relatively large quantity of antennas are usually used to perform a beamforming operation, to implement coverage to a relatively far distance.

In a high frequency communications system, to ensure a transmission distance, beam widths are relatively narrow. Therefore, signal quality of an optimal beam for current communication may be decreased in some scenarios. For example, when a user moves out of transmission beam coverage, or an obstruction covers an optimal beam, or in another scenario, transmission between a base station and the user may be interrupted.

In an existing high frequency communications system, when a base station detects, based on an uplink reference signal, that performance of an uplink transmission beam is decreased, the base station sends a reference signal and scheduling information of the reference signal for a beam improvement, and the scheduling information is sent on a downlink transmission beam. A user feeds back a measurement result for the reference signal and the scheduling information of the reference signal on an original transmission beam, and the base station selects an optimal beam based on the measurement result fed back by the user and performs data transmission on the optimal beam. However, in an existing solution, the user needs to perform an uplink feedback by using the original transmission beam, and when the original transmission beam is interrupted, the uplink feedback is interrupted. Consequently, communication between the base station and the user may be interrupted.

SUMMARY

Embodiments of this application provide a communication method, to avoid interruption of communication between a base station and a terminal device.

According to a first aspect, a communication method is provided. The method includes:

sending, by a base station, first indication information to a terminal device, where the first indication information is used to instruct the terminal device to perform uplink transmission by using at least one configured resource, and the at least one resource includes a resource that is different from a resource currently used by the terminal device; and receiving, by the base station, one or more signals sent by the terminal device by using one or more resources in the at least one resource according to the first indication information.

Optionally, the method may further include: determining, by the base station based on the one or more signals, a target resource used for uplink transmission in the one or more resources.

The base station instructs the terminal device to perform uplink transmission by using the at least one configured resource, and receives the signal sent by the terminal device by using the at least one resource, so that the base station can redetermine, based on the signal, the target resource used for uplink transmission, to avoid a case in which the terminal device cannot perform uplink transmission because a signal on a currently used resource is interrupted, thereby avoiding interruption of communication between the base station and the terminal device.

Specifically, when the at least one configured resource is one resource, the configured resource is different from the resource currently used by the terminal device. When the at least one configured resource is a plurality of resources, the plurality of configured resources may include the resource currently used by the terminal device, or may not include the resource currently used by the terminal device. The terminal device is instructed to perform uplink transmission by using the at least one configured resource, so that the case in which uplink transmission cannot be performed because the signal on the currently used resource is interrupted can be avoided.

Optionally, the sending, by a base station, first indication information to a terminal device includes: when the base station determines that signal quality of a currently used resource does not satisfy a preset condition, sending the first indication information to the terminal device. The currently used resource may be the resource currently used by the terminal device, or may be a resource currently used by the base station.

In a possible implementation, the at least one resource includes at least one beam, and the target resource includes a target beam.

The at least one beam may be a transmit beam of the terminal device and/or a receive beam of the base station.

Optionally, the at least one resource further includes a time domain resource, a frequency domain resource, and/or a code domain resource corresponding to the at least one beam, and the target resource further includes a time domain resource, a frequency domain resource, and/or a code domain resource corresponding to the target beam.

In a possible implementation, the first indication information includes beam indication information and resource configuration information, the beam indication information is used to indicate the at least one beam, and the resource configuration information is used to indicate the time domain resource, the frequency domain resource, and/or the code domain resource corresponding to the at least one beam.

In this way, after receiving the first indication information, the terminal device may perform uplink transmission by using the plurality of beams and the time domain resource, the frequency domain resource, and/or the code domain resource corresponding to the plurality of beams.

In a possible implementation, before the sending, by a base station, first indication information to a terminal device, the method further includes:

sending, by the base station, beam indication information and resource configuration information to the terminal device, where the beam indication information is used to indicate the at least one beam, and the resource configuration information is used to indicate the time domain resource, the frequency domain resource, and/or the code domain resource corresponding to the at least one beam.

In this way, the base station may pre-send the resource configuration information to the terminal device, and after receiving the first indication information, the terminal performs uplink transmission by using the plurality of beams and the resource corresponding to the plurality of beams.

In a possible implementation, the one or more signals carry second indication information, and the second indication information is used to indicate that the terminal device does not use a remaining resource other than the one or more resources in the at least one resource to perform uplink transmission.

After receiving the second indication information sent by the terminal device, the base station may use the remaining resource for another uplink or downlink transmission, to save transmission resources.

Optionally, the base station may send the second indication information by using a low frequency signal. In this way, even if a beam on which a high frequency signal is transmitted between the base station and the terminal device is interrupted, the base station may still send the second indication information to the terminal device, to help improve robustness in the communication process.

According to a second aspect, a communication method is provided. The method includes:

receiving, by a terminal device, first indication information sent by a base station, where the first indication information is used to instruct the terminal device to perform uplink transmission by using at least one configured resource, and the at least one resource includes a resource that is different from a resource currently used by the terminal device; and sending, by the terminal device, one or more signals to the base station by using one or more resources in the at least one resource according to the first indication information.

The terminal device sends the one or more signals to the base station by using the one or more uplink resources as indicated by the base station, so that the base station can redetermine, based on the one or more signals, a target resource used for uplink transmission, to avoid a case in which the terminal device cannot perform uplink transmission because a signal on the currently used resource is interrupted, thereby avoiding interruption of communication between the base station and the terminal device.

In a possible implementation, the at least one resource includes at least one beam, and the target resource includes a target beam.

The at least one beam may be a transmit beam of the terminal device and/or a receive beam of the base station.

Optionally, the at least one resource further includes a time domain resource, a frequency domain resource, and/or a code domain resource corresponding to the at least one beam, and the target resource further includes a time domain resource, a frequency domain resource, and/or a code domain resource corresponding to the target beam.

In a possible implementation, the first indication information includes beam indication information and resource configuration information, the beam indication information is used to indicate the at least one beam, and the resource configuration information is used to indicate a time domain resource, a frequency domain resource, and/or a code domain resource corresponding to the at least one resource.

In a possible implementation, before the receiving, by a terminal device, first indication information sent by a base station, the method further includes:

receiving, by the terminal device, beam indication information and resource configuration information that are sent by the base station, where the beam indication information is used to indicate the at least one beam, and the resource configuration information is used to indicate the time domain resource, the frequency domain resource, and/or the code domain resource corresponding to the at least one beam.

In a possible implementation, the one or more signals carry second indication information, and the second indication information is used to indicate that the terminal device does not use a remaining resource other than the one or more resources in the at least one resource to perform uplink transmission.

In this way, the base station can use the remaining resource for another uplink or downlink transmission, to save transmission resources.

According to a third aspect, a communication method is provided. The method includes:

sending, by a base station, a plurality of signals to a terminal device by using a plurality of downlink resources; and receiving, by the base station, a feedback signal sent by the terminal device, where the feedback signal carries a result of detection performed by the terminal device on the plurality of signals.

Optionally, the method may further include: determining, by the base station, a target downlink resource used for downlink transmission in the plurality of downlink resources based on the detection result.

The base station sends the plurality of signals to the terminal device by using the plurality of downlink resources, and receives the detection result for the at least one signal that is sent by the terminal device, to redetermine a target downlink resource based on the detection result, thereby avoiding interruption of communication between the base station and the terminal device.

Optionally, the sending, by a base station, a plurality of signals to a terminal device by using a plurality of downlink resources includes: when the base station determines that signal quality of a currently used downlink resource does not satisfy a preset condition, sending the plurality of signals to the terminal device by using the plurality of downlink resources.

The plurality of downlink resources may include the downlink resource currently used by the base station, or may not include the downlink resource currently used by the base station. The plurality of signals are sent to the terminal device by using the plurality of downlink resources, so that a case in which a downlink signal sent by the base station cannot arrive at the terminal device because a signal on the downlink resource currently used by the base station is interrupted can be avoided.

In a possible implementation, before the sending, by a base station, a plurality of signals to a terminal device by using a plurality of downlink resources, the method further includes:

sending, by the base station, indication information to the terminal device, where the indication information is used to instruct the terminal device to detect the plurality of signals.

After receiving the indication information, the terminal device may receive and detect the plurality of signals on corresponding resources. This helps reduce power consumption of the terminal device.

In a possible implementation, the plurality of downlink resources include a plurality of beams, and the target downlink resource includes a target beam.

The plurality of beams may be transmit beams of the base station and/or receive beams of the terminal device.

Optionally, the plurality of downlink resources further include a time domain resource, a frequency domain resource, and/or a code domain resource corresponding to the plurality of beams, and the target downlink resource further includes a time domain resource, a frequency domain resource, and/or a code domain resource corresponding to the target beam.

In a possible implementation, before the sending, by a base station, a plurality of signals to a terminal device by using a plurality of downlink resources, the method further includes:

sending, by the base station, beam indication information and resource configuration information to the terminal device, where the beam indication information is used to indicate at least one of the beams, and the resource configuration information is used to indicate a time frequency resource corresponding to the at least one of the beams.

In a possible implementation, the receiving, by the base station, a feedback signal sent by the terminal device includes:

receiving, by the base station, at least one feedback signal sent by the terminal device by using at least one uplink resource, where the at least one feedback signal carries a detection result for the plurality of signals.

According to a fourth aspect, a communication method is provided. The method includes:

receiving, by a terminal device, a plurality of signals sent by a base station by using a plurality of downlink resources;

detecting, by the terminal device, the plurality of signals; and sending, by the terminal device, a feedback signal to the base station, where the feedback signal carries a detection result for the plurality of signals.

The terminal device feeds back the detection result for the plurality of signals sent by the base station to the base station, so that the base station can redetermine a target downlink resource based on the detection result, thereby avoiding interruption of communication between the base station and the terminal device.

In a possible implementation, before the receiving, by a terminal device, a plurality of signals sent by a base station by using a plurality of downlink resources, the method further includes:

receiving, by the terminal device, indication information sent by the base station, where the indication information is used to instruct the terminal device to detect the plurality of signals.

In a possible implementation, the plurality of downlink resources include a plurality of beams, and the target resource includes a target beam.

Optionally, the plurality of downlink resources further include a time domain resource, a frequency domain resource, and/or a code domain resource corresponding to the plurality of beams, and the target resource further includes a time domain resource, a frequency domain resource, and/or a code domain resource corresponding to the target beam.

In a possible implementation, before the receiving, by a terminal device, a plurality of signals sent by a base station by using a plurality of downlink resources, the method further includes:

receiving, by the terminal device, beam indication information and resource configuration information that are sent by the base station, where the beam indication information is used to indicate the plurality of beams, and the resource configuration information is used to indicate the time domain resource, the frequency domain resource, and/or the code domain resource corresponding to the plurality of beams.

In a possible implementation, the sending, by the terminal device, a feedback signal to the base station includes:

sending, by the terminal device, at least one feedback signal to the base station by using at least one uplink resource, where the at least one feedback signal carries the detection result for the plurality of signals.

According to a fifth aspect, a communication method is provided. The method includes:

receiving, by a base station, at least one signal sent by a terminal device by using at least one uplink resource, where the at least one signal is used to indicate signal quality of a downlink resource; and determining, by the base station, the signal quality of the downlink resource based on the at least one signal.

The base station determines the signal quality of the downlink resource based on the signal sent by the terminal device, so that the base station can perform processing in time when a signal condition of the downlink resource does not satisfy a preset condition, thereby avoiding interruption of communication between the base station and the terminal device.

In a possible implementation, the at least one signal carries indication information, and the indication information is used to indicate the signal quality of the downlink resource; and the determining, by the base station, the signal quality of the downlink resource based on the at least one signal includes:

determining, by the base station, the signal quality of the downlink resource according to the indication information carried in the at least one signal.

In a possible implementation, each of the at least one signal carries same indication information.

Specifically, the indication information may be a sequence.

In a possible implementation, the at least one uplink resource occupied by the at least one signal is used to indicate the signal quality of the downlink resource, and the determining, by the base station, the signal quality of the downlink resource based on the at least one signal includes:

determining, by the base station, the signal quality of the downlink resource based on the at least one uplink resource occupied by the at least one signal and a preconfigured correspondence, where the correspondence is a correspondence between the signal quality of the downlink resource and the uplink resource occupied by the signal sent by the terminal device.

In a possible implementation, the at least one uplink resource includes at least one uplink beam, and the downlink resource includes a downlink beam.

Optionally, the at least one uplink resource further includes a time domain resource, a frequency domain resource, and/or a code domain resource corresponding to the at least one uplink beam, and the downlink resource further includes a time domain resource, a frequency domain resource, and/or a code domain resource corresponding to the downlink beam.

According to a sixth aspect, a communication method is provided. The method includes:

determining, by a terminal device, signal quality of a downlink resource; and sending, by the terminal device, at least one signal to a base station by using at least one uplink resource, where the at least one signal is used to indicate the signal quality of the downlink resource.

The terminal device sends the at least one signal to the base station, to indicate the signal quality of the downlink resource, so that the base station can learn of the signal quality of the downlink resource in time, and the base station can perform processing in time when a signal condition of the downlink resource does not satisfy a preset condition, thereby avoiding interruption of communication between the base station and the terminal device.

In a possible implementation, the at least one signal carries indication information, and the indication information is used to indicate the signal quality of the downlink resource.

In a possible implementation, each of the at least one signal carries same indication information.

Specifically, the indication information may be a sequence.

In a possible implementation, the at least one uplink resource occupied by the at least one signal is used to indicate the signal quality of the downlink resource, and before the sending, by the terminal device, at least one signal to a base station by using at least one uplink resource, the method further includes:

determining, by the terminal device, the signal quality of the downlink resource used by the base station; and determining, by the terminal device, the at least one uplink resource based on the signal quality of the downlink resource and a preconfigured correspondence, where the correspondence is a correspondence between the signal quality of the downlink resource and the uplink resource occupied by the signal sent by the terminal device.

In a possible implementation, the at least one uplink resource includes at least one uplink beam, and the downlink resource includes a downlink beam.

Optionally, the at least one uplink resource further includes a time domain resource, a frequency domain resource, and/or a code domain resource corresponding to the at least one uplink beam, and the downlink resource further includes a time domain resource, a frequency domain resource, and/or a code domain resource corresponding to the downlink beam.

In a possible implementation, when the terminal device sends the at least one signal to the base station by using the at least one uplink resource, an uplink beam is switched for every K symbols, and K is preconfigured.

According to a seventh aspect, a base station is provided. The base station is configured to perform the method according to any one of the first aspect or the foregoing possible implementations of the first aspect.

Specifically, the base station may include units configured to perform the method according to any one of the first aspect or the possible implementations of the first aspect.

According to an eighth aspect, a terminal device is provided. The terminal device is configured to perform the method according to any one of the second aspect or the foregoing possible implementations of the second aspect.

Specifically, the terminal device may include units configured to perform the method according to any one of the second aspect or the possible implementations of the second aspect.

According to a ninth aspect, a base station is provided. The base station is configured to perform the method according to any one of the third aspect or the foregoing possible implementations of the third aspect.

Specifically, the base station may include units configured to perform the method according to any one of the third aspect or the possible implementations of the third aspect.

According to a tenth aspect, a terminal device is provided. The terminal device is configured to perform the method according to any one of the fourth aspect or the foregoing possible implementations of the fourth aspect.

Specifically, the terminal device may include units configured to perform the method according to any one of the fourth aspect or the possible implementations of the fourth aspect.

According to an eleventh aspect, a base station is provided. The base station is configured to perform the method according to any one of the fifth aspect or the foregoing possible implementations of the fifth aspect.

Specifically, the base station may include units configured to perform the method according to any one of the fifth aspect or the possible implementations of the fifth aspect.

According to a twelfth aspect, a terminal device is provided. The terminal device is configured to perform the method according to any one of the sixth aspect or the foregoing possible implementations of the sixth aspect.

Specifically, the terminal device may include units configured to perform the method according to any one of the sixth aspect or the possible implementations of the sixth aspect.

According to a thirteenth aspect, a computer-readable storage medium is provided. The computer-readable storage medium stores a program, and the program enables a base station to perform the method according to any one of the first aspect or the possible implementations of the first aspect.

According to a fourteenth aspect, a computer-readable storage medium is provided. The computer-readable storage medium stores a program, and the program enables a terminal device to perform the method according to any one of the second aspect or the possible implementations of the second aspect.

According to a fifteenth aspect, a computer-readable storage medium is provided. The computer-readable storage medium stores a program, and the program enables a base station to perform the method according to any one of the third aspect or the possible implementations of the third aspect.

According to a sixteenth aspect, a computer-readable storage medium is provided. The computer-readable storage medium stores a program, and the program enables a terminal device to perform the method according to any one of the fourth aspect or the possible implementations of the fourth aspect.

According to a seventeenth aspect, a computer-readable storage medium is provided. The computer-readable storage medium stores a program, and the program enables a base station to perform the method according to any one of the fifth aspect or the possible implementations of the fifth aspect.

According to an eighteenth aspect, a computer-readable storage medium is provided. The computer-readable storage medium stores a program, and the program enables a terminal device to perform the method according to any one of the sixth aspect or the possible implementations of the sixth aspect.

DESCRIPTION OF EMBODIMENTS

Figure 1:
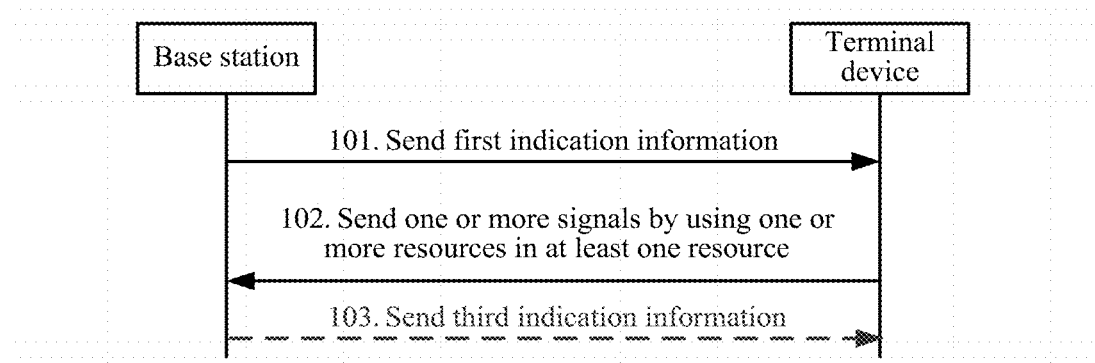
FIG. 1 is a schematic flowchart of a communication method according to an embodiment of this application.

The following describes the technical solutions in the embodiments of this application with reference to the accompanying drawings in the embodiments of this application.

It should be understood that, the technical solutions of this application can be applied to a high frequency communications system, can further be applied to a high frequency communication and low frequency communication-compatible communications system, and can further be applied to various other communications systems, for example, a wireless fidelity (Wi-Fi) system, a Worldwide Interoperability for Microwave Access (Worldwide Interoperability for Microwave Access, WiMAX) system, a Global system for Mobile Communications (Global System for Mobile communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, a Long Term Evolution Advanced (Advanced long term evolution, LTE-A) system, a Universal Mobile Telecommunication System (Universal Mobile Telecommunication System, UMTS), and a 3rd Generation Partnership Project (The 3rd Generation Partnership Project, 3GPP)-related cellular system. This is not limited in the embodiments of this application. However, for ease of description, in the embodiments of this application, an LTE network is used as an example for description.

The embodiments of this application can be applied to radio networks of different standards. A radio access network may include different network elements in different systems. For example, network elements in a radio access network in Long Term Evolution (Long Term Evolution, LTE) and LTE-A include an evolved NodeB (eNodeB, eNB), and network elements in a radio access network in Wideband Code Division Multiple Access (Wideband Code Division Multiple Access, WCDMA) include a radio network controller (Radio Network Controller, RNC) and a NodeB. Similarly, another radio network such as Worldwide Interoperability for Microwave Access (Worldwide Interoperability for Microwave Access, WiMax) may also use solutions similar to those in the embodiments of this application, and only related modules in a base station system may be different. This is not limited in the embodiments of this application. However, for ease of description, in the following embodiments, a base station is used as an example for description.

It should be further understood that, in the embodiments of this application, a terminal device may also be referred to as user equipment (User Equipment, UE), a mobile station (Mobile Station, MS), a mobile terminal (Mobile Terminal), or the like. The terminal may communicate with one or more core networks by using a radio access network (Radio Access Network, RAN). For example, the terminal may be a mobile phone (or referred to as a "cellular" phone) or a computer having a communication function. For example, the terminal may be a portable, pocket-sized, handheld, computer built-in, or in-vehicle mobile apparatus.

It should be understood that, a beam in the embodiments of this application may alternatively be represented by using an antenna port or a space domain resource.

FIG. 1 is a schematic flowchart of a communication method 100 according to an embodiment of this application. As shown in FIG. 1, the communication method 100 includes the following content.

Operation 101. A base station sends first indication information to a terminal device, where the first indication information is used to instruct the terminal device to perform uplink transmission by using at least one configured resource.

The at least one resource includes a resource that is different from a resource currently used by the terminal device. When the at least one configured resource is one resource, the resource is different from the currently used resource. When the at least one configured resource is a plurality of resources, the plurality of resources may include the resource currently used by the terminal device, or may not include the resource currently used by the terminal device. The terminal device is instructed to perform uplink transmission by using the at least one configured resource, so that a case in which uplink transmission cannot be performed because a signal on the currently used resource is interrupted can be avoided.

The first indication information may be carried in downlink control information (Downlink Control Information, DCI), or may be carried in another higher layer signaling.

The base station may send the first indication information by using a high frequency signal, or may send the first indication information by using a low frequency signal.

The at least one resource may include at least one beam. Herein, the at least one beam may be a transmit beam of the terminal device and/or a receive beam of the base station.

Optionally, the at least one resource may further include a time domain resource, a frequency domain resource, and/or a code domain resource corresponding to the at least one beam.

The time domain resource may be used to indicate a subframe, a symbol, a time unit, a transmission time interval, a slot, a mini-slot, or the like that is occupied by the signal. For example, the time domain resource may include an absolute value of a number of the subframe and/or the symbol that is occupied by the signal, and the like, and may further include a relative value between the subframe occupied by the signal and a preset subframe and a relative value between the symbol occupied by the signal and a preset symbol. The code domain resource may be determined based on a beam identifier and a cell identifier.

Operation 102. After receiving the first indication, the terminal device sends one or more signals to the base station by using one or more resources in the at least one resource according to the first indication information.

In some embodiments, the terminal device may send the signal by using the at least one beam and the time domain resource, the frequency domain resource, and/or the code domain resource corresponding to the at least one beam.

Information carried in the one or more signals may be the same or may be different. This is not limited in this embodiment of this application. Each signal may carry same information, or may carry different redundancy versions of the same information. For example, each signal may carry at least one of the following information or different redundancy versions of the at least one of the following information: acknowledgement information ACK/NACK, channel state information (Channel State Information, CSI), and a preamble sequence (preamble). In the prior art, the ACK/NACK and/or the CSI may be transmitted by using a physical uplink control channel (PUCCH), and the preamble sequence may be transmitted by using a physical random access channel (PRACH). This is also applicable to this embodiment of this application. The at least one signal may alternatively be a reference signal or a physical uplink shared channel (PUSCH).

Optionally, after receiving the one or more signals, the base station may further determine a target resource used for uplink transmission in the one or more resources based on the one or more signals.

The target resource may include a target beam, and the target beam may be a transmit beam of the terminal device and/or a receive beam of the base station.

Optionally, the target resource may further include a time domain resource, a frequency domain resource, and/or a code domain resource corresponding to the target beam.

For example, the base station may select, based on signal quality of the one or more signals, a resource occupied by a signal having optimal signal quality as the target resource.

In this embodiment of this application, the base station instructs the terminal device to perform uplink transmission by using the at least one configured resource, and redetermines the target resource based on the signal sent by the terminal device by using the at least one resource, to avoid the case in which the terminal device cannot perform uplink transmission because the signal on the currently used resource is interrupted, thereby avoiding interruption of communication between the base station and the terminal device.

Optionally, step 101 may include: when determining that signal quality of a currently used resource does not satisfy a preset condition, sending, by the base station, the first indication information to the terminal device. That the signal quality of the currently used resource does not satisfy the preset condition includes: the signal quality of the currently used resource is decreased, or the signal on the currently used resource is interrupted, or a signal quality parameter of the currently used resource is less than or equal to a preset threshold.

When uplink and downlink transmission do not have reciprocity, the currently used resource may be the uplink resource currently used by the terminal device. The base station may determine, by performing strength detection on an uplink reference signal sent by the terminal device, whether signal quality of a current beam satisfies the preset condition. When determining that the signal quality of the uplink beam currently used by the terminal device does not satisfy the preset condition, the base station instructs the terminal device to perform uplink transmission by using a plurality of configured uplink beams. In this way, the base station can track the plurality of uplink beams used by the terminal device, to determine a new uplink beam used for uplink transmission.

When uplink and downlink transmission have reciprocity, the currently used resource may be a downlink resource currently used by the base station, or may be the uplink resource currently used by the terminal device. When the currently used resource is an uplink resource, a process is similar to that in the foregoing description, and details are not described herein again. When the currently used resource is a downlink resource, if the base station determines the currently used downlink resource needs to be switched because signal quality of the currently used downlink resource does not satisfy the preset condition, due to reciprocity of uplink and downlink transmission, an uplink resource currently used by the terminal device also needs to be switched. Therefore, the base station may instruct the terminal device to perform uplink transmission by using a plurality of configured uplink resources, and determine a target uplink resource used for uplink transmission in the plurality of uplink resources, and then further determine a target downlink resource used for downlink transmission.

It should be noted that, in this embodiment of this application, when uplink and downlink transmission have reciprocity, there is a correspondence between an uplink beam and a downlink beam.

If uplink and downlink transmission have reciprocity, and the currently used resource is a downlink resource, the base station may further receive a plurality of beam tracking requests used by the terminal device, and determine, based on the plurality of beam tracking requests, whether signal quality of the currently used downlink resource satisfies the preset condition. Optionally, the base station may determine, based on resources occupied by the plurality of beam tracking requests, whether the signal quality of the currently used downlink resource satisfies the preset condition, or determine, according to indication information carried in the plurality of beam tracking requests, whether the signal quality of the currently used downlink resource satisfies the preset condition. For details, refer to the following related descriptions of a method shown in FIG. 5. To avoid repetition, corresponding descriptions are properly omitted herein.

The base station may further determine, based on scenario prediction or another manner, whether the signal quality of the currently used beam satisfies the preset condition.

In some embodiments, the first indication information may include beam indication information and resource configuration information, the beam indication information is used to indicate the at least one beam, and the resource configuration information is used to indicate the time domain resource, the frequency domain resource, and/or the code domain resource corresponding to the at least one beam.

In this way, after receiving the first indication information, the terminal device may perform uplink transmission by using the plurality of beams and the time domain resource, the frequency domain resource, and/or the code domain resource corresponding to the plurality of beams.

Optionally, before step 101, the method 100 may further include:

sending, by the base station, beam indication information and resource configuration information to the terminal device, where the beam indication information is used to indicate the at least one beam, and the resource configuration information is used to indicate the time domain resource, the frequency domain resource, and/or the code domain resource corresponding to the at least one beam.

In this way, the base station may pre-send the resource configuration information to the terminal device, and after receiving the first indication information, the terminal performs uplink transmission by using the plurality of beams and the resource corresponding to the plurality of beams.

The beam indication information and the resource configuration information may be carried in DCI, or may be carried in another configuration signaling. This is not limited in this embodiment of this application.

Specifically, the beam indication information may include beam IDs and/or port (port) numbers of the plurality of beams. In some embodiments, a bit length of signaling in which the beam indication information is located may be determined based on a quantity of beams. For example, if the quantity of beams is N, the signaling may be of a bit length of $4\lceil \log_2 N \rceil$, to indicate beam IDs of N beams.

Optionally, the resource configuration information may further include a correspondence between a beam and a time domain resource, a frequency domain resource, and/or a code domain resource. For example, a plurality of beams may correspond to a same time domain resource, frequency domain resource, and/or code domain resource, or a plurality of beams may respectively correspond to different time domain resources, frequency domain resources, and/or code domain resources.

In some embodiments, the resource configuration information may be implemented by using a plurality of bits. For example, as shown in the following Table 1, a resource configuration table shown in Table 1 may be preconfigured in the base station and the terminal device. After receiving the resource configuration information, the terminal device may determine, based on the preconfigured resource configuration table, a plurality of beams configured by the base station for the terminal device and a time domain resource, a frequency domain resource, and/or a code domain resource corresponding to the plurality of beams. It should be understood that, a resource configuration in the third column in the following Table 1 includes the time domain resource, the frequency domain resource, and/or the code domain resource corresponding to the beam, and the resource configuration may be configured in a predefined manner or by using higher layer signaling.

TABLE 1

| Uplink transmission resource configuration signaling of the base station | Quantity of beams for uplink transmission | Resource configuration for uplink transmission |
|---|---|---|
| 00 | 2 | Configuration 2-1 |
| 01 | 4 | Configuration 4-2 |
| 10 | 4 | Configuration 4-3 |
| 11 | 4 | Configuration 4-4 |

For example, if resource configuration signaling received by the terminal device is 01, a user performs uplink transmission by using four beams and a resource that is indicated by the configuration 4-2. The configuration 4-2 may be a symbol #10 of a subframe n+m, and symbols #11, #12, and #13 of a subframe n+m+4; or the configuration 4-2 may be frequency domain resource 0, 1, 2, and 3 on subframes n+m, n+m+3, n+m+7, and n+m+11, or the configuration 4-2 may be subframes n+m, n+m+1, n+m+2, and n+m+3. In other words, the plurality of beams may respectively occupy different symbols in a same subframe, or may respectively occupy symbols in different subframes.

Optionally, the one or more signals sent by the terminal device carry second indication information, and the second indication information is used to indicate that the terminal device does not use a remaining resource other than the one or more resources in the at least one resource to perform uplink transmission.

To be specific, if signal quality of some beams in the at least one configured beam satisfies the preset condition, the terminal device may perform uplink transmission by using only the some beams, and notifies the base station by using the second indication information. After receiving the second indication information sent by the terminal device, the base station may use a remaining beam and a time domain resource, a frequency domain resource, and/or a code domain resource corresponding to the remaining beam for uplink or downlink transmission, to save transmission resources.

The base station may send the second indication information by using a low frequency signal, so that even if a beam on which a high frequency signal is transmitted between the base station and the terminal device is interrupted, the base station may still send the second indication information to the terminal device. For example, the second indication information may be carried in low frequency higher layer signaling, a physical layer control indication, or a physical layer random access channel High frequency communication is assisted by low frequency communication, thereby helping improve robustness in the communication process. However, this is not limited in this embodiment of this application. The base station may alternatively send the second indication information by using a high frequency signal.

Optionally, when the terminal device sends a plurality of ACKs and/or channel state information (Channel State Information, CSI) by using the plurality of beams according to the first indication information, namely, the terminal device performs a plurality of ACK and/or CSI feedbacks, the terminal device may determine a transmit subcarrier spacing corresponding to the ACK and/or CSI feedback based on the quantity of configured beams. The ACK or CSI feedback may be sent by using a fixed subcarrier spacing that is different from a data subcarrier spacing. For example, a relationship between the quantity of configured beams and a subcarrier spacing for uplink transmission is shown in Table 2, when the terminal device performs an ACK feedback and a CSI feedback by using different quantities of beams, if the data subcarrier spacing shown in Table 2 is used, time domain resources occupied by a plurality of ACK feedbacks and a plurality of CSI feedbacks performed by using a plurality of beams can be the same as time domain resources occupied by a single ACK feedback and a single CSI feedback. However, this is not limited in this embodiment of this application, and another manner may further be used to determine a subcarrier spacing for transmission.

TABLE 2

| Quantity of beams | Subcarrier spacing for transmission |
| --- | --- |
| 1 | Data subcarrier spacing × 1 |
| 2 | Data subcarrier spacing × 2 |
| 4 | Data subcarrier spacing × 4 |

Optionally, after step 103, the method 100 may further include:

sending, by the base station, third indication information to the terminal device, where the third indication information is used to instruct the terminal device to perform uplink transmission by using the target resource.

In this way, after receiving the third indication information, the terminal device may send an uplink signal by using the target resource.

When uplink and downlink transmission do not have reciprocity, the base station may send the third indication information by using an original downlink resource.

When uplink and downlink transmission have reciprocity, in step 103, after determining a target uplink resource used for uplink transmission, the base station further needs to determine a target downlink resource used for downlink transmission. Correspondingly, the base station may send the third indication information to the terminal device by using the target downlink resource.

In some embodiments, after determining the target downlink resource, the base station may indicate the target downlink resource to be used by the base station to the terminal device by using a low frequency signal, so that the terminal device may receive, on the target downlink resource, a downlink signal sent by the base station.

In some embodiments, if the base station does not notify the terminal device of the target downlink resource to be used by the base station after determining the target downlink resource, the terminal device does not know the target downlink resource to be used by the base station. In this case, the terminal device may receive a downlink signal on a plurality of downlink resources corresponding to a plurality of uplink resources used by the terminal device. In this way, even if the terminal device does not know the downlink resource to be used by the base station, the terminal device can still receive the signal sent by the base station. Descriptions are provided below with reference to FIG. 2.

Figure 2:
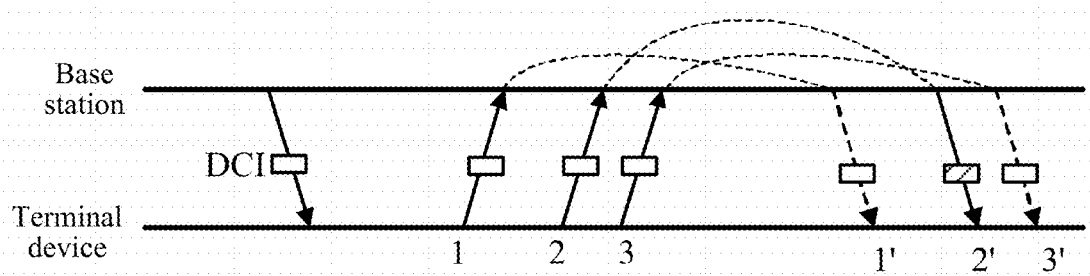
FIG. 2 is a schematic flowchart of a communication method according to another embodiment of this application.

FIG. 2 is a schematic flowchart of a communication method according to another embodiment of this application. As shown in FIG. 2, when determining that signal quality of a current beam is decreased, a base station instructs, by using DCI, a terminal device to send three uplink signals by using an uplink beam 1, an uplink beam 2, an uplink beam 3, and their corresponding resource 1, resource 2, and resource 3. After receiving the three uplink signals, the base station selects the uplink beam 2 from the three uplink signals as a target uplink beam after switching based on quality of the three uplink beams. If uplink and downlink transmission have reciprocity, a downlink resource 1, a downlink resource 2, and a downlink resource 3 respectively correspond to an uplink resource 1', an uplink resource 2', and an uplink resource 3'. Dashed lines in FIG. 2 represent the correspondences between the uplink resources and the downlink resources. The base station uses a downlink beam 2' corresponding to the uplink beam 2 as a target downlink beam after the switching, and the base station sends a downlink signal to UE by using the downlink beam 2' and its corresponding resource 2'. Because the terminal device cannot learn of the target downlink beam after the switching, the terminal device receives the downlink signal on the downlink resource 1', the downlink resource 2', and the downlink resource 3' corresponding to the uplink resource 1, the uplink resource 2, and the uplink resource 3. In this way, even if the downlink beam is switched, it can be ensured that the terminal device receives the downlink signal.

In some embodiments, if the terminal device does not receive the first indication information sent by the base station in step 102 because signal quality of a beam used by the base station to send the first indication information does not satisfy the preset condition (for example, the beam is interrupted), the base station may send a plurality of beam tracking signals to the terminal device by using a plurality of downlink beams, the terminal device may feed back a detection result for the plurality of beam signals to the base station, and the base station may determine, based on the detection result for the plurality of beam tracking signals, a target downlink beam used for downlink transmission. For detailed descriptions, refer to the following related descriptions of a method shown in FIG. 3. To avoid repetition, details are not described herein again.

Figure 3:
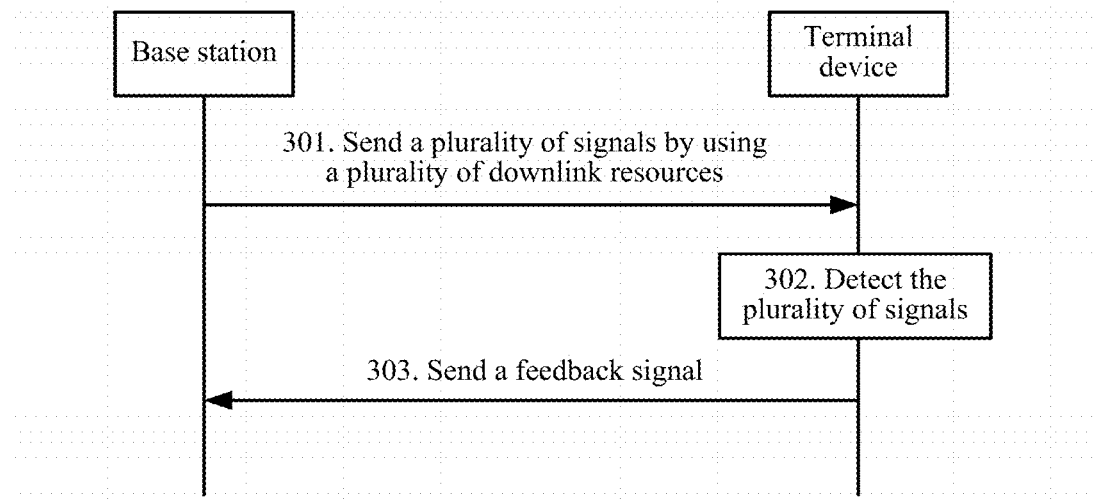
FIG. 3 is a schematic flowchart of a communication method according to another embodiment of this application.

FIG. 3 is a schematic flowchart of a communication method 300 according to another embodiment of this application. As shown in FIG. 3, the method 300 includes the following content.

Operation 301. A base station sends a plurality of signals to a terminal device by using a plurality of downlink resources.

Figure 4:
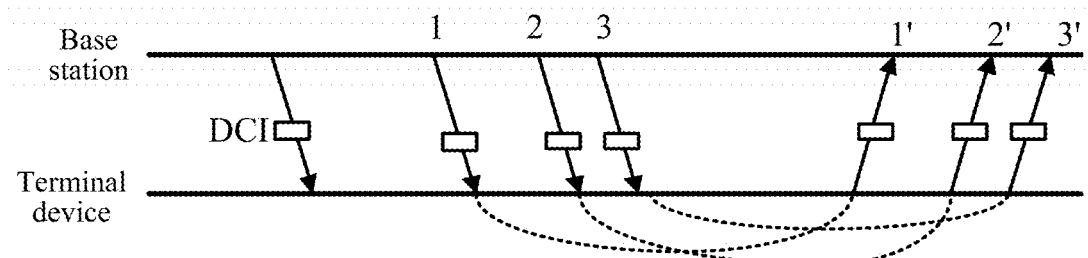
FIG. 4 is a schematic flowchart of a communication method according to another embodiment of this application.

In some embodiments, the plurality of signals may be a plurality of beam tracking signals, as in the embodiment shown in FIG. 4. However, this is not limited in this embodiment of this application.

The plurality of downlink resources include a plurality of beams. Herein, the plurality of beams may be transmit beams of the base station and/or receive beams of the terminal device.

Optionally, the plurality of downlink resources may further include a time domain resource, a frequency domain resource, and/or a code domain resource corresponding to the plurality of beams.

The time domain resource may be used to indicate a subframe, a symbol, a time unit, a transmission time interval, a slot, a mini-slot, or the like that is occupied by the signal. For example, the time domain resource may include an absolute value of a number of the subframe and/or the symbol that is occupied by the signal, and the like, and may further include a relative value between the subframe occupied by the signal and a preset subframe and a relative value between the symbol occupied by the signal and a preset symbol. The code domain resource may be determined based on a beam identifier and a cell identifier.

It should be understood that, the plurality of downlink resources may be configured for the terminal device through predefinition or higher layer signaling configuration, so that the terminal device can receive, based on the plurality of downlink resources, the signal sent by the base station.

Operation 302. After receiving the plurality of signals, the terminal device detects the plurality of signals.

Operation 303. The terminal device sends a feedback signal to the base station, where the feedback signal carries a detection result for the plurality of signals.

Optionally, the feedback signal may be a low frequency signal. In this way, even if a beam used to transmit a high frequency signal between the base station and the terminal device is interrupted, the terminal device may still send the detection result for the plurality of beam tracking signals to the base station by using the low frequency signal, thereby helping improve robustness in the communication process. However, this is not limited in this embodiment of this application, and the feedback signal may alternatively be a high frequency signal.

The terminal device may send the feedback signal by using a feedback resource. In some embodiments, the feedback resource may be predefined or preconfigured in the terminal device. In some embodiments, the feedback resource may be referred to as a beam tracking feedback resource.

In some embodiments, a correspondence between the downlink resource and the feedback resource may further be predefined and preconfigured in the terminal device, and the terminal device may determine the feedback resource based on the downlink resource and the correspondence.

Optionally, after receiving the detection result, the base station determines a target downlink resource used for downlink transmission in the plurality of downlink resources based on the detection result.

Optionally, the target downlink resource may include a target beam.

Optionally, the target downlink resource may further include a time domain resource, a frequency domain resource, and/or a code domain resource corresponding to the target beam.

The target beam may be a transmit beam of the base station and/or a receive beam of the terminal device.

The detection result for the plurality of signals may include at least one of the following: an identifier of an optimal downlink resource in the plurality of downlink resources, an order of the plurality of downlink resources, and a measurement result for the plurality of signals.

For example, the base station may use a downlink resource indicated by the detection result as the target downlink resource, or the base station may use a downlink resource ranked first in the order indicated by the detection result as the target downlink resource, or the base station may use, based on the measurement result for the plurality of signals, a downlink resource whose signal quality is the best as the target downlink resource.

In this embodiment of this application, the plurality of signals are sent to the terminal device by using the plurality of downlink resources, and the target downlink resource is redetermined based on the detection result for the plurality of signals that is sent by the terminal device, thereby avoiding interruption of communication between the base station and the terminal device.

In addition, beam switching can be completed in time when a signal on a currently used beam is interrupted.

When uplink and downlink transmission have reciprocity, the base station may further determine a target uplink resource based on the target downlink resource, and instruct the terminal device to perform uplink transmission by using the target uplink resource.

Optionally, step 303 may include: sending, by the terminal device, at least one feedback signal to the base station by using at least one uplink resource, where the at least one feedback signal carries the detection result for the plurality of signals.

To be specific, the terminal device may send one feedback signal by using one uplink resource, or may send a plurality of feedback signals by using a plurality of uplink resources.

The at least one uplink resource includes at least one uplink beam. The at least one uplink beam may be a transmit beam of the terminal device and/or a receive beam of the base station.

Optionally, the at least one uplink resource may further include a time domain resource, a frequency domain resource, and/or a code domain resource corresponding to the at least one uplink beam.

When the terminal device sends a plurality of feedback signals by using a plurality of uplink resources, the plurality of uplink resources correspond to the plurality of downlink resources used by the base station. For example, one uplink resource corresponds to a plurality of downlink resources, or one uplink resource corresponds to one downlink resource, or a plurality of uplink resources correspond to one downlink resource. It should be understood that, the feedback signal and a downlink signal detection result carried in the feedback signal may also satisfy the correspondence between the uplink resource and the downlink resource. For example, if a first uplink resource corresponds to a first downlink resource and a second downlink resource, a first feedback signal may carry a detection result for signals sent by using the first downlink resource and the second downlink resource.

As shown in FIG. 4, the base station may configure downlink resources 1, 2, and 3 for the terminal device by using DCI, and the base station sends three beam tracking signals by using the downlink resource 1, the downlink resource 2, and the downlink resource 3, so that the terminal device may receive and detect the beam tracking signals on the downlink resources. Because uplink and downlink transmission have reciprocity, the downlink resource 1, the downlink resource 2, and the downlink resource 3 respectively correspond to an uplink resource 1', an uplink resource 2', and an uplink resource 3' (dashed lines in FIG. 4 represent the correspondences between the uplink resources and the downlink resources). Correspondingly, the terminal device may send feedback signals by using the uplink resource 1', the uplink resource 2', and the uplink resource 3'. In addition, the feedback signal on the uplink resource 1' carries a detection result for the beam tracking signal on the downlink resource 1, the feedback signal on the uplink resource 2' carries a detection result for the beam tracking signal on the downlink resource 2, and the feedback signal on the uplink resource 3' carries a detection result for the beam tracking signal on the downlink resource 3.

The plurality of downlink resources used by the base station to send the signals may include a downlink resource currently used by the base station, or may not include the currently used downlink resource.

Optionally, before step 301, the method 300 may further include:

sending, by the base station, indication information to the terminal device, where the indication information is used to instruct the terminal device to detect the plurality of signals.

To be specific, after receiving the indication information, the terminal device may receive and detect the plurality of signals on corresponding resources. This helps reduce power consumption of the terminal device.

The base station may send the first indication information by carrying the first indication information in a high frequency signal, or may send the first indication information by carrying the first indication information in a low frequency signal.

Optionally, before step 301, the method 300 may further include:

sending, by the base station, beam indication information and resource configuration information to the terminal device, where the beam indication information is used to indicate the plurality of beams, and the resource configuration information is used to indicate the time domain resource, the frequency domain resource, and/or the code domain resource corresponding to the plurality of beams.

In this embodiment of this application, the base station may preconfigure, for the terminal device, resources for the plurality of to-be-sent signals, so that the terminal device can receive and detect the plurality of signals on the resources.

In some embodiments, after receiving the beam indication information and the resource configuration information, the terminal device may further detect a plurality of beam tracking signals on beam tracking resources.

Optionally, step 301 may include: when determining that signal quality of a currently used resource does not satisfy a preset condition, sending, by the base station, the plurality of signals by using the plurality of downlink resources.

The plurality of downlink resources may include the downlink resource currently used by the base station, or may not include the downlink resource currently used by the base station. The plurality of signals are sent to the terminal device by using the plurality of downlink resources, so that a case in which a downlink signal sent by the base station cannot arrive at the terminal device because a signal on the downlink resource currently used by the base station is interrupted can be avoided.

When uplink and downlink transmission do not have reciprocity, the current resource may be the downlink resource currently used by the base station. When uplink and downlink transmission have reciprocity, the currently used resource may be the downlink resource currently used by the base station, or may be an uplink resource currently used by the terminal device.

Optionally, the base station may receive the beam tracking requests sent by the terminal device, and determine, based on the plurality of beam tracking requests, that signal quality of the current beam does not satisfy the preset condition. For details, refer to the following related descriptions of a method shown in FIG. 5. To avoid repetition, corresponding descriptions are properly omitted herein. The base station may further determine, based on scenario prediction or another manner, whether the signal quality of the current beam satisfies the preset condition.

Figure 5:
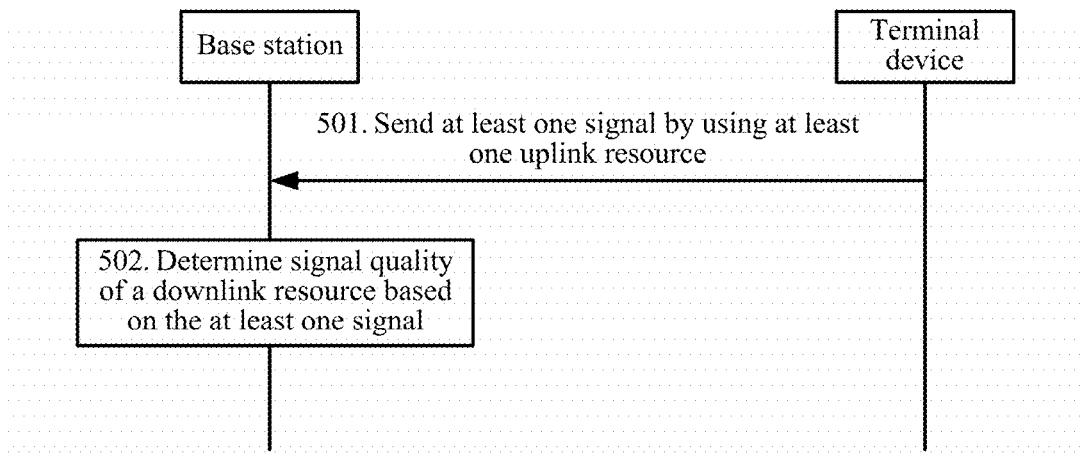
FIG. 5 is a schematic flowchart of a communication method according to another embodiment of this application.

FIG. 5 is a schematic flowchart of a communication method 500 according to another embodiment of this application. As shown in FIG. 5, the method 500 includes the following content.

Operation 501. A terminal device sends at least one signal to a base station by using at least one uplink resource, where the at least one signal is used to indicate signal quality of a downlink resource used by the base station.

For example, the at least one signal may be used to indicate whether the signal quality of the downlink resource satisfies a preset condition, or may be used to indicate a downlink resource whose signal quality does not satisfy the preset condition, or may be used to indicate a downlink resource whose signal quality satisfies the preset condition. It should be understood that, when the at least one signal is used to indicate a downlink resource whose signal quality satisfies the preset condition, the base station may determine that signal quality of another downlink resource in preconfigured plurality of downlink resources does not satisfy the preset condition.

The at least one uplink resource may be configured by using higher layer signaling, or may be determined by the terminal device in a preconfigured uplink resource set.

It should be understood that, the terminal device may determine the signal quality of the downlink resource by detecting a downlink reference signal.

It should be further understood that, the at least one signal may be transmitted at a high frequency, or may be transmitted at a low frequency. For example, the at least one signal may be carried in low frequency higher layer signaling, a physical layer control indication, or a physical layer random access channel for transmission. High frequency communication is assisted by low frequency communication, thereby helping improve robustness in the communication process.

Operation 502. After receiving the at least one signal, the base station determines the signal quality of the downlink resource based on the at least one signal.

In this embodiment of this application, the base station can learn of the signal quality of the downlink resource in time, so that the base station can perform processing in time when a signal condition of the downlink resource does not satisfy the preset condition, thereby avoiding interruption of communication between the base station and the terminal device.

Optionally, in step 502, the determining, by the base station, the signal quality of the downlink resource based on the at least one signal includes:

determining, by the base station based on the at least one signal, that the signal quality of the downlink resource satisfies the preset condition; or determining, by the base station based on the at least one signal, that signal quality of at least one downlink resource does not satisfy the preset condition; or determining, by the base station based on the at least one signal, that signal quality of at least one downlink resource satisfies the preset condition.

The at least one signal may further be used to instruct the base station to start a beam scanning (which is also referred to as beam tracking) process. After the base station receives the at least one signal, the base station starts the beam scanning process regardless of the signal quality of the downlink resource that is indicated by the at least one signal. Specifically, the base station sends a plurality of beam scanning signals, and the terminal device measures the plurality of beam scanning signals and reports a measurement result to the base station. Then, the base station may redetermine, based on the measurement result reported by the terminal device, a downlink resource used for downlink transmission.

It should be noted that, the base station may determine, based on the signal quality of the downlink resource that is indicated by the at least one signal, to-be-scanned beams, to be specific, beams used to send the beam scanning signals, in the beam scanning process. For example, the base station may scan, as indicated by the signal sent by the terminal device, a beam whose signal quality satisfies the preset condition, to redetermine a to-be-used target beam. For example, if the base station records four beams, and the signal sent by the terminal device indicates that signal quality of a beam whose number is 3 does not satisfy the preset condition, the base station may scan other three beams.

In some embodiments, the base station may determine a target downlink beam in the plurality of downlink resources according to a preconfigured rule. For example, the base station preconfigures priorities of the plurality of downlink resources. After determining a downlink resource whose signal quality does not satisfy the preset condition, the base station may select a downlink beam whose priority is the highest from remaining downlink resources as the target downlink beam.

In some embodiments, the at least one signal may further be used to trigger the base station to perform beam tracking. For example, the at least one signal may be a beam tracking request. Optionally, after step 502, the method 500 may further include:

sending, by the base station, a plurality of beam tracking signals by using the plurality of downlink resources;

detecting, by the terminal device, the received plurality of beam tracking signals, and sending a detection result for the plurality of beam tracking signals to the base station; and determining, by the base station based on the received detection result, a target downlink resource used for downlink transmission in the plurality of downlink resources.

To be specific, after step 502, the procedure of the method shown in FIG. 3 may further be performed. For a detailed process, refer to related content in the foregoing descriptions, and details are not described herein again.

In this way, the base station may perform downlink transmission by using the target downlink resource, thereby avoiding communication interruption caused by a decrease of the signal quality of the downlink resource.

Optionally, if uplink and downlink transmission have reciprocity, the base station may further determine a target uplink resource based on the target downlink resource, and instruct the terminal device to perform uplink transmission by using the target uplink resource.

In this embodiment of this application, the uplink resource includes an uplink beam, and the downlink resource includes a downlink beam.

The uplink beam may be a transmit beam of the terminal device and/or a receive beam of the base station, and the downlink beam may be a transmit beam of the base station and/or a receive beam of the terminal device.

Optionally, the uplink resource may further include a time domain resource, a frequency domain resource, and/or a code domain resource corresponding to the uplink beam, and the downlink resource may further include a time domain resource, a frequency domain resource, and/or a code domain resource corresponding to the downlink beam.

The time domain resource may be used to indicate a subframe, a symbol, a time unit, a transmission time interval, a slot, a mini-slot, or the like that is occupied by the signal. For example, the time domain resource may include an absolute value of a number of the subframe and/or the symbol that is occupied by the signal, and the like, and may further include a relative value between the subframe occupied by the signal and a preset subframe and a relative value between the symbol occupied by the signal and a preset symbol. The code domain resource may be determined based on a beam identifier and a cell identifier.

Optionally, the at least one signal carries indication information, and the indication information is used to indicate the signal quality of the downlink resource. Specifically, each of the at least one signal may carry same indication information, or may carry different indication information.

Correspondingly, step 502 may include:

determining, by the base station, the signal quality of the downlink resource according to the indication information carried in the at least one signal.

In some embodiments, the indication information may be implemented by using a sequence, and different indication information corresponds to different sequences.

In some embodiments, each of the at least one signal sent by the terminal device carry a same sequence.

It should be understood that, the indication information may alternatively be implemented by using another modulation information. In this case, each of the at least one signal sent by the terminal device may carry same indication information, or may carry different indication information. When each of the at least one signal carries different indication information, at least one indication information carried in the at least one signal may be used to indicate the signal quality of the downlink resource together.

Optionally, the at least one uplink resource occupied by the at least one signal is used to indicate the signal quality of the downlink resource.

Optionally, before step 501, the method 500 may further include:

determining, by the terminal device, the signal quality of the downlink resource used by the base station; and determining, by the terminal device, the at least one uplink resource based on the signal quality of the downlink resource and a preconfigured correspondence, where the correspondence is a correspondence between the signal quality of the downlink resource and the uplink resource occupied by the signal sent by the terminal device.

Correspondingly, step 502 may include:

determining, by the base station, the signal quality of the downlink resource based on the at least one uplink resource occupied by the at least one signal sent by the terminal device and a preconfigured correspondence, where the correspondence is a correspondence between the signal quality of the downlink resource and the uplink resource occupied by the signal sent by the terminal device.

In this way, the base station may determine the signal quality of the current downlink resource based on the resource occupied by the signal sent by the terminal device.

The following Table 3 shows some examples of the correspondence between the uplink resource occupied by the signal sent by the terminal device and the signal quality of the downlink resource. It should be understood that, the second column in Table 3 may alternatively be a number of a downlink resource whose signal quality satisfies the preset condition. This is not limited in this embodiment of this application.

TABLE 3

| Number of an occupied uplink resource | Number of a downlink resource whose signal quality does not satisfy the preset condition |
|---|---|
| 0 | 0 |
| 1 | 1 |
| 2 | 2 |
| 3 | 3 |
| 4 | 0, and 1 |
| 5 | 0, and 2 |
| 6 | 0, and 3 |
| 7 | 1, and 2 |
| 8 | 1, and 3 |
| 9 | 2, and 3 |

TABLE 3-continued

| Number of an occupied uplink resource | Number of a downlink resource whose signal quality does not satisfy the preset condition |
|---|---|
| 10 | 0, 1, and 2 |
| 11 | 0, 1, and 3 |
| 12 | 0, 2, and 3 |
| 13 | 1, 2, and 3 |
| 14 | 1, 2, 3, and 4 |
| 15 | None |

Optionally, when the terminal device sends the at least one signal to the base station by using the at least one uplink resource, an uplink beam is switched for every K symbols, and K is preconfigured. For example, K may be configured for the terminal device through predefinition or higher layer signaling configuration, or K may be configured for the terminal device by using a system information block (System Information Block, SIB).

In this way, the terminal device may send the signal by using a plurality of beams, so that a case in which the signal sent by the terminal device cannot arrive at the base station because some beams are interrupted can be avoided.

The base station may receive, by using different receive beams, the signal sent by the terminal device.

In some embodiments, the base station may further determine, based on a direction of the receive beam, a quantity of symbols continuously received on each receive beam. For example, one symbol may be received for a near receive beam, and a plurality of symbols may be continuously received for a far receive beam. In this way, it can be ensured that each receive beam receives a signal having sufficient strength.

The communication method in the embodiments of this application is described above, and the base station and the terminal device in the embodiments of this application are described below with reference to FIG. 6 to FIG. 17.

Figure 6:
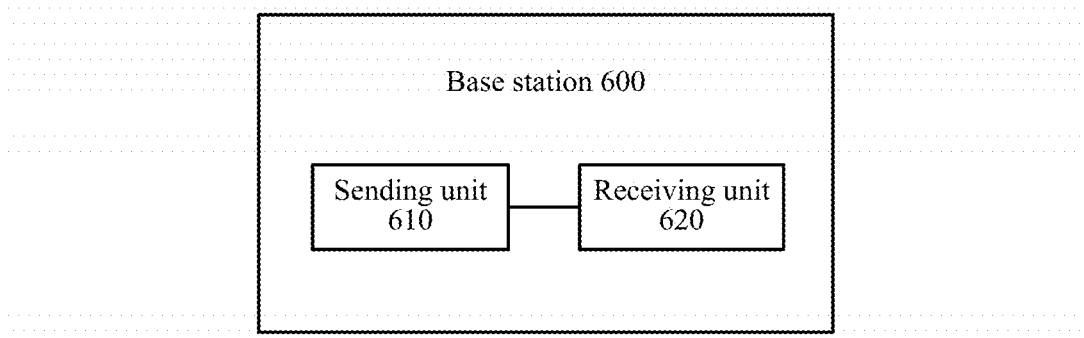
FIG. 6 is a schematic structural diagram of a base station according to an embodiment of this application.

FIG. 6 is a schematic structural diagram of a base station 600 according to an embodiment of this application. As shown in FIG. 6, the base station 600 includes a sending unit 610 and a receiving unit 620.

The sending unit 610 is configured to send first indication information to a terminal device, the first indication information is used to instruct the terminal device to perform uplink transmission by using at least one configured resource, and the at least one resource includes a resource that is different from a resource currently used by the terminal device.

The receiving unit 620 is configured to receive one or more signals sent by the terminal device by using one or more resources in the at least one resource according to the first indication information.

The base station in this embodiment of this application instructs the terminal device to perform uplink transmission by using the at least one configured resource, and receives the signal sent by the terminal device by using the at least one resource, so that the base station can redetermine, based on the signal, a target resource used for uplink transmission, to avoid a case in which the terminal device cannot perform uplink transmission because a signal on the currently used resource is interrupted, thereby avoiding interruption of communication between the base station and the terminal device.

Optionally, the at least one resource includes at least one beam, and the target resource includes a target beam.

Optionally, the at least one resource further includes a time domain resource, a frequency domain resource, and/or a code domain resource corresponding to the at least one beam, and the target resource further includes a time domain resource, a frequency domain resource, and/or a code domain resource corresponding to the target beam.

Optionally, the first indication information includes beam indication information and resource configuration information, the beam indication information is used to indicate the at least one beam, and the resource configuration information is used to indicate the time domain resource, the frequency domain resource, and/or the code domain resource corresponding to the at least one beam.

Optionally, the sending unit 610 is further configured to: before sending the first indication information to the terminal device, send beam indication information and resource configuration information to the terminal device, the beam indication information is used to indicate the at least one beam, and the resource configuration information is used to indicate the time domain resource, the frequency domain resource, and/or the code domain resource corresponding to the at least one beam.

Optionally, the one or more signals carry second indication information, and the second indication information is used to indicate that the terminal device does not use a remaining resource other than the one or more resources in the at least one resource to perform uplink transmission.

It should be understood that, the base station 600 according to this embodiment of this application may correspond to the base station in the communication method 100 according to the embodiments of this application, and the foregoing and other operations and/or functions of the units in the base station 600 are respectively used to implementing corresponding procedures of the method 100 shown in FIG. 1. For brevity, details are not described herein again.

It should be noted that, the sending unit 610 and the receiving unit 620 may be implemented by using a transceiver.

Figure 7:
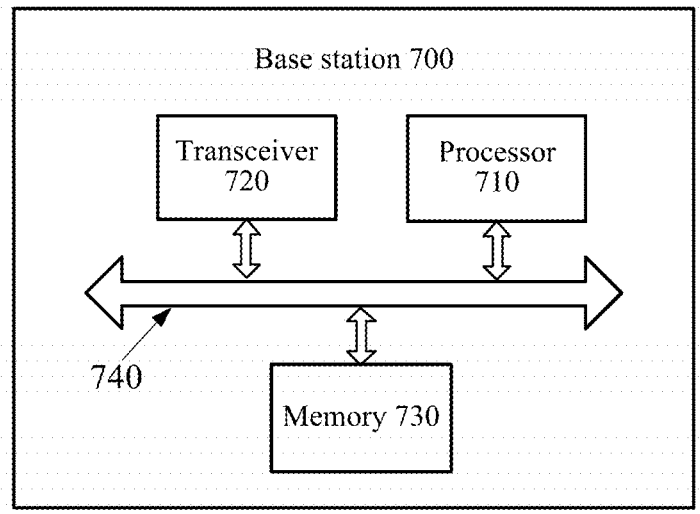
FIG. 7 is a schematic structural diagram of a base station according to another embodiment of this application.

FIG. 7 is a schematic structural diagram of a base station 700 according to another embodiment of this application. As shown in FIG. 7, the base station 700 includes a processor 710, a transceiver 720, a memory 730, and a bus system 740. All the components in the base station 700 are coupled together by using the bus system 740.

The memory 730 may be configured to store code executed by the processor 710 and the like. The transceiver 720 is configured to receive and send a signal under control of the processor 710.

Specifically, the transceiver 720 may be configured to implement the functions of the sending unit 610 and the receiving unit 620.

It should be understood that, the base station 700 according to this embodiment of this application may correspond to the base station in the communication method 100 according to the embodiments of this application and the base station 600 according to the embodiments of this application, and the foregoing and other operations and/or functions of the units in the base station 700 are respectively used to implementing corresponding procedures of the method 100 shown in FIG. 1. For brevity, details are not described herein again.

Figure 8:
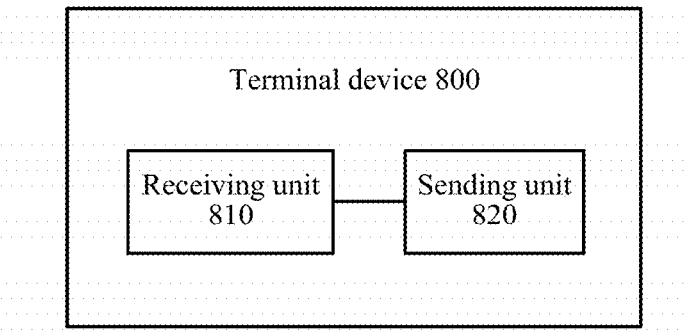
FIG. 8 is a schematic structural diagram of a terminal device according to an embodiment of this application.

FIG. 8 is a schematic structural diagram of a terminal device 800 according to an embodiment of this application. As shown in FIG. 8, the terminal device 800 includes a receiving unit 810 and a sending unit 820.

The receiving unit 810 is configured to receive first indication information sent by a base station, the first indication information is used to instruct the terminal device to perform uplink transmission by using at least one configured resource, and the at least one resource includes a resource that is different from a resource currently used by the terminal device.

The sending unit 820 is configured to send one or more signals to the base station by using one or more resources in the at least one resource according to the first indication information received by the receiving unit 810.

The terminal device in this embodiment of this application sends the one or more signals to the base station by using the one or more uplink resources as indicated by the base station, so that the base station can redetermine, based on the one or more signals, a target resource used for uplink transmission, to avoid a case in which the terminal device cannot perform uplink transmission because a signal on the currently used resource is interrupted, thereby avoiding interruption of communication between the base station and the terminal device.

Optionally, the at least one resource includes at least one beam, and the target resource includes a target beam.

Optionally, the at least one resource further includes a time domain resource, a frequency domain resource, and/or a code domain resource corresponding to the at least one beam, and the target resource further includes a time domain resource, a frequency domain resource, and/or a code domain resource corresponding to the target beam.

Optionally, the first indication information includes beam indication information and resource configuration information, the beam indication information is used to indicate the at least one beam, and the resource configuration information is used to indicate a time domain resource, a frequency domain resource, and/or a code domain resource corresponding to the at least one resource.

Optionally, the receiving unit is further configured to: before receiving the first indication information, receive beam indication information and resource configuration information that are sent by the base station, the beam indication information is used to indicate the at least one beam, and the resource configuration information is used to indicate the time domain resource, the frequency domain resource, and/or the code domain resource corresponding to the at least one beam.

Optionally, the one or more signals carry second indication information, and the second indication information is used to indicate that the terminal device does not use a remaining resource other than the one or more resources in the at least one resource to perform uplink transmission.

It should be understood that, the terminal device 800 according to this embodiment of this application may correspond to the terminal device in the communication method 100 according to the embodiments of this application, and the foregoing and other operations and/or functions of the units in the terminal device 800 are respectively used to implementing corresponding procedures of the method 100 shown in FIG. 1. For brevity, details are not described herein again.

It should be noted that, the receiving unit 810 and the sending unit 820 may be implemented by using a transceiver.

Figure 9:
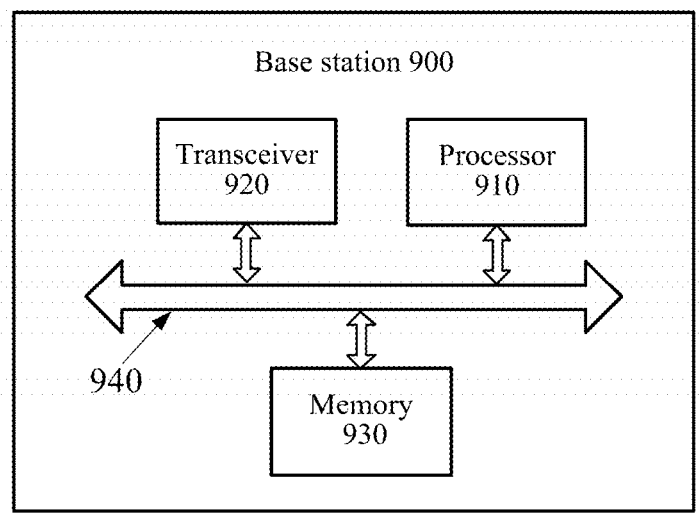
FIG. 9 is a schematic structural diagram of a terminal device according to another embodiment of this application.

FIG. 9 is a schematic structural diagram of a terminal device 900 according to another embodiment of this application. As shown in FIG. 9, the terminal device 900 includes a processor 910, a transceiver 920, a memory 930, and a bus system 940. All the components in the terminal device 900 are coupled together by using the bus system 940.

The memory 930 may be configured to store code executed by the processor 910 and the like. The transceiver 920 is configured to receive and send a signal under control of the processor 910.

Specifically, the transceiver 920 is configured to implement the functions of the receiving unit 810 and the sending unit 820.

It should be understood that, the terminal device 900 according to this embodiment of this application may correspond to the terminal device in the communication method 100 according to the embodiments of this application and the terminal device 800 according to the embodiments of this application, and the foregoing and other operations and/or functions of the units in the terminal device 900 are respectively used to implement corresponding procedures of the method 100 shown in FIG. 1. For brevity, details are not described herein again.

Figure 10:
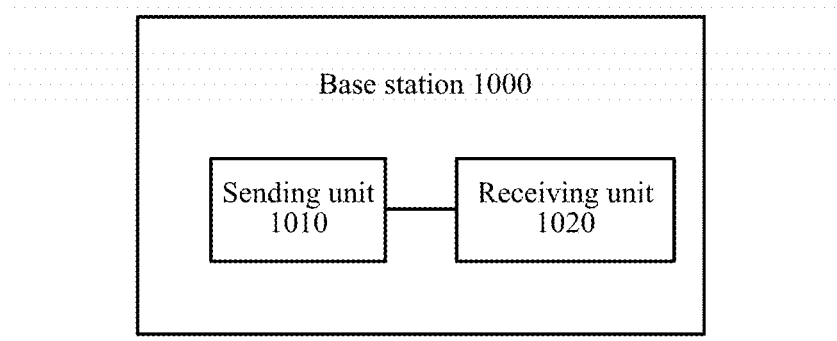
FIG. 10 is a schematic structural diagram of a base station according to another embodiment of this application.

FIG. 10 is a schematic structural diagram of a base station 1000 according to another embodiment of this application. As shown in FIG. 10, the base station 1000 includes a sending unit 1010 and a receiving unit 1020.

The sending unit 1010 is configured to send a plurality of signals to a terminal device by using a plurality of downlink resources.

The receiving unit 1020 is configured to receive a feedback signal sent by the terminal device, and the feedback signal carries a result of detection performed by the terminal device on the plurality of signals.

The base station in this embodiment of this application sends the plurality of signals to the terminal device by using the plurality of downlink resources, and receives the detection result for at least one of the signals that is sent by the terminal device, to redetermine a target downlink resource based on the detection result, thereby avoiding interruption of communication between the base station and the terminal device.

Optionally, the sending unit 1010 is further configured to: before sending the plurality of signals, send indication information to the terminal device, and the indication information is used to instruct the terminal device to detect the plurality of signals.

Optionally, the plurality of downlink resources include a plurality of beams, and the target downlink resource includes a target beam.

Optionally, the plurality of downlink resources further include a time domain resource, a frequency domain resource, and/or a code domain resource corresponding to the plurality of beams, and the target downlink resource further includes a time domain resource, a frequency domain resource, and/or a code domain resource corresponding to the target beam.

Optionally, the sending unit 1010 is further configured to: before sending the plurality of signals, send beam indication information and resource configuration information to the terminal device, the beam indication information is used to indicate the plurality of beams, and the resource configuration information is used to indicate a time frequency resource corresponding to the plurality of beams.

Optionally, the receiving unit 1020 is specifically configured to receive at least one feedback signal sent by the terminal device by using at least one uplink resource, and the at least one feedback signal carries the detection result for the plurality of signals.

It should be understood that, the base station 1000 according to this embodiment of this application may correspond to the base station in the communication method 300 according to the embodiments of this application, and the foregoing and other operations and/or functions of the units in the base station 1000 are respectively used to implementing corresponding procedures of the method 300 shown in FIG. 3. For brevity, details are not described herein again.

It should be noted that, the sending unit 1010 and the receiving unit 1020 may be implemented by using a transceiver.

Figure 11:
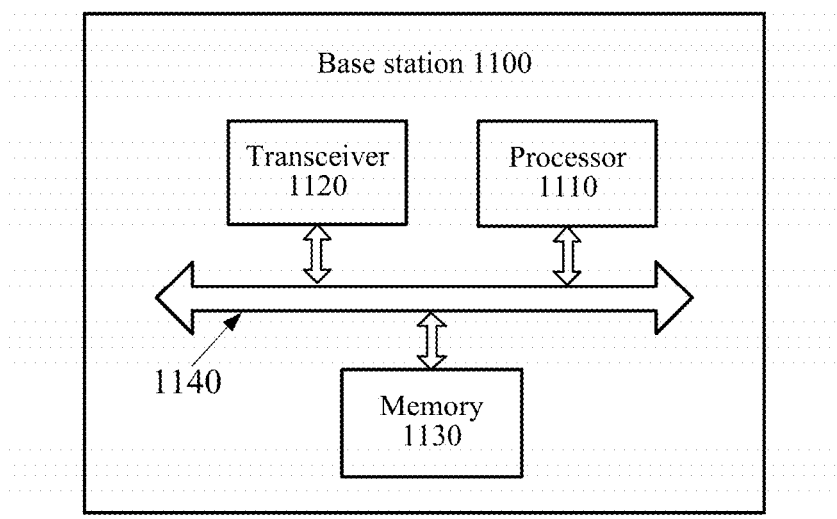
FIG. 11 is a schematic structural diagram of a base station according to another embodiment of this application.

FIG. 11 is a schematic structural diagram of a terminal device 1100 according to another embodiment of this application. As shown in FIG. 11, the terminal device 1100 includes a processor 1110, a transceiver 1120, a memory 1130, and the bus system 1140. All the components in the terminal device 1100 are coupled together by using the bus system 1140.

The memory 1130 may be configured to store code executed by the processor 1110 and the like. The transceiver 1120 is configured to receive and send a signal under control of the processor 1110.

Specifically, the transceiver 1120 is configured to implement the functions of the sending unit 1010 and the receiving unit 1020.

It should be understood that, the base station 1100 according to this embodiment of this application may correspond to the base station in the communication method 300 according to the embodiments of this application and the base station 1000 according to the embodiments of this application, and the foregoing and other operations and/or functions of the units in the base station 1100 are respectively used to implementing corresponding procedures of the method 300 shown in FIG. 3. For brevity, details are not described herein again.

Figure 12:
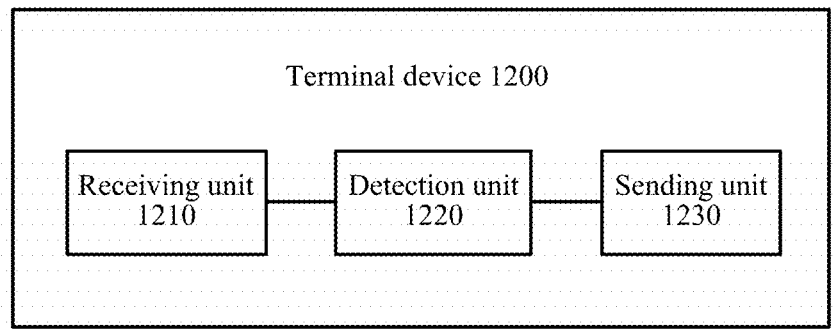
FIG. 12 is a schematic structural diagram of a terminal device according to another embodiment of this application.

FIG. 12 is a schematic structural diagram of a terminal device 1200 according to another embodiment of this application. As shown in FIG. 12, the terminal device 1200 includes a receiving unit 1210, a detection unit 1220, and a sending unit 1230.

The receiving unit 1210 is configured to receive a plurality of signals sent by a base station by using a plurality of downlink resources.

The detection unit 1220 is configured to detect the plurality of signals.

The sending unit 1230 is configured to send a feedback signal to the base station, and the feedback signal carries a detection result for the plurality of signals.

The terminal device in this embodiment of this application feeds back the detection result for the plurality of signals sent by the base station to the base station, so that the base station can redetermine a target downlink resource based on the detection result, thereby avoiding interruption of communication between the base station and the terminal device.

Optionally, the receiving unit 1210 is further configured to: before receiving the plurality of signals, receive indication information sent by the base station, and the indication information is used to instruct the terminal device to detect the plurality of signals.

Optionally, the plurality of downlink resources include a plurality of beams, and a target resource includes a target beam.

Optionally, the plurality of downlink resources further include a time domain resources, a frequency domain resource, and/or a code domain resource corresponding to the plurality of beams, and the target resource further includes a time domain resource, a frequency domain resource, and/or a code domain resource corresponding to the target beam.

Optionally, the receiving unit 1210 is further configured to: before receiving the plurality of signals, receive beam indication information and resource configuration information that are sent by the base station, the beam indication information is used to indicate the plurality of beams, and the resource configuration information is used to indicate the time domain resource, the frequency domain resource, and/or the code domain resource corresponding to the plurality of beams.

Optionally, the sending unit 1230 is specifically configured to send at least one feedback signal to the base station by using at least one uplink resource, and the at least one feedback signal carries the detection result for the plurality of signals.

It should be noted that, the receiving unit 1210 and the sending unit 1230 may be implemented by using a transceiver, and the detection unit 1220 may be implemented by using a processor.

Figure 13:
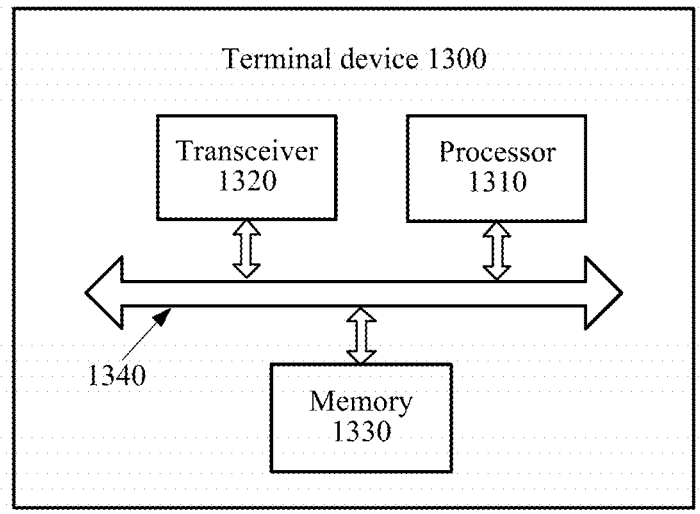
FIG. 13 is a schematic structural diagram of a terminal device according to another embodiment of this application.

FIG. 13 is a schematic structural diagram of a terminal device 1300 according to another embodiment of this application. As shown in FIG. 13, the terminal device 1300 includes a processor 1310, a transceiver 1320, a memory 1330, and a bus system 1340. All the components in the terminal device 1300 are coupled together by using the bus system 1340.

The memory 1330 may be configured to store code executed by the processor 1310 and the like. The transceiver 1320 is configured to receive and send a signal under control of the processor 1310.

Specifically, the transceiver 1320 is configured to implement the functions of the receiving unit 1210 and the sending unit 1230. The processor 1310 is configured to implement the function of the detection unit 1220.

It should be understood that, the terminal device 1300 according to this embodiment of this application may correspond to the terminal device in the communication method 300 according to the embodiments of this application and the terminal device 1200 according to the embodiments of this application, and the foregoing and other operations and/or functions of the units in the terminal device 1300 are respectively used to implementing corresponding procedures of the method 300 shown in FIG. 3. For brevity, details are not described herein again.

Figure 14:
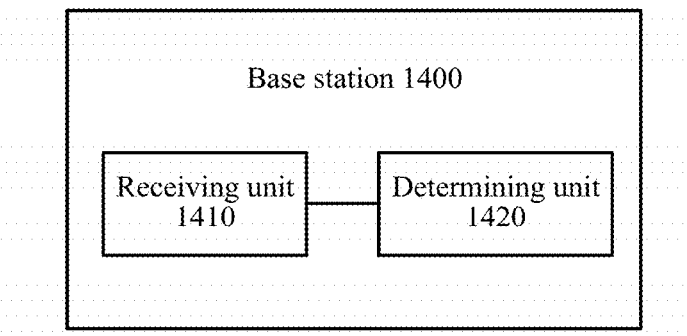
FIG. 14 is a schematic structural diagram of a base station according to another embodiment of this application.

FIG. 14 is a schematic structural diagram of a base station 1400 according to another embodiment of the present invention. As shown in FIG. 14, the base station 1400 includes a receiving unit 1410 and a determining unit 1420.

The receiving unit 1410 is configured to receive at least one signal sent by a terminal device by using at least one uplink resource, and the at least one signal is used to indicate signal quality of a downlink resource.

The determining unit 1420 is configured to determine the signal quality of the downlink resource based on the at least one signal.

The base station in this embodiment of this application determines the signal quality of the downlink resource based on the signal sent by the terminal device, so that the base station can perform processing in time when a signal condition of the downlink resource does not satisfy a preset condition, thereby avoiding interruption of communication between the base station and the terminal device.

Optionally, the at least one signal carries indication information, and the indication information is used to indicate the signal quality of the downlink resource. Correspondingly, the determining unit 1420 is specifically configured to determine the signal quality of the downlink resource according to the indication information carried in the at least one signal.

Optionally, each of the at least one signal carries same indication information.

Optionally, the at least one uplink resource occupied by the at least one signal is used to indicate the signal quality of the downlink resource. Correspondingly, the determining unit 1420 is specifically configured to determine the signal quality of the downlink resource based on the at least one uplink resource occupied by the at least one signal and a preconfigured correspondence, and the correspondence is a correspondence between the signal quality of the downlink resource and the uplink resource occupied by the signal sent by the terminal device.

Optionally, the at least one uplink resource includes at least one uplink beam, and the downlink resource includes a downlink beam.

Optionally, the at least one uplink resource further includes a time domain resource, a frequency domain resource, and/or a code domain resource corresponding to the at least one uplink beam, and the downlink resource further includes a time domain resource, a frequency domain resource, and/or a code domain resource corresponding to the downlink beam.

It should be understood that, the base station 1400 according to this embodiment of this application may correspond to the base station in the communication method 500 according to the embodiments of this application, and the foregoing and other operations and/or functions of the units in the base station 1400 are respectively used to implementing corresponding procedures of the method 500 shown in FIG. 5. For brevity, details are not described herein again.

It should be understood that, the receiving unit 1410 may alternatively be implemented by using a receiver, and the determining unit 1420 may alternatively be implemented by using a processor.

Figure 15:
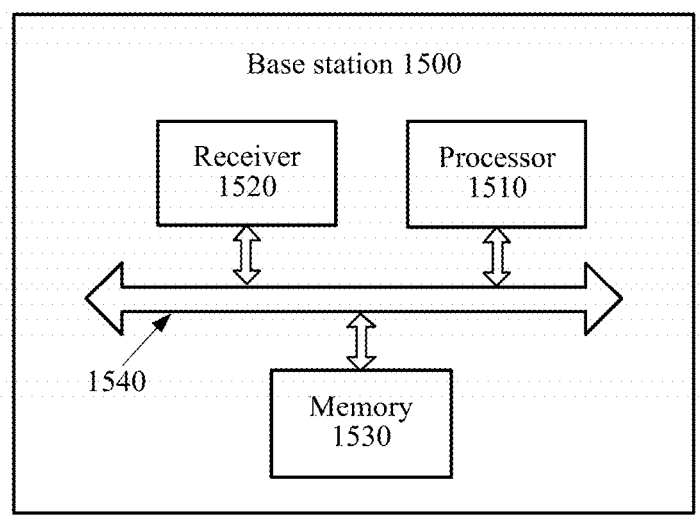
FIG. 15 is a schematic structural diagram of a base station according to another embodiment of this application.

FIG. 15 is a schematic structural diagram of a base station 1500 according to another embodiment of this application. As shown in FIG. 15, the base station 1500 includes a processor 1510, a receiver 1520, a memory 1530, and a bus system 1540. All the components in the base station 1500 are coupled together by using the bus system 1540.

The memory 1530 may be configured to store code executed by the processor 1510 and the like. The receiver 1520 is configured to receive a signal under control of the processor 1510.

Specifically, the receiver 1520 is configured to implement the function of the receiving unit 1410. The processor 1510 is configured to implement the function of the determining unit 1420.

It should be understood that, the base station 1500 according to this embodiment of this application may correspond to the base station in the communication method 500 according to the embodiments of this application and the base station 1400 according to the embodiments of this application, and the foregoing and other operations and/or functions of the units in the base station 1500 are respectively used to implementing corresponding procedures of the method 500 shown in FIG. 5. For brevity, details are not described herein again.

Figure 16:
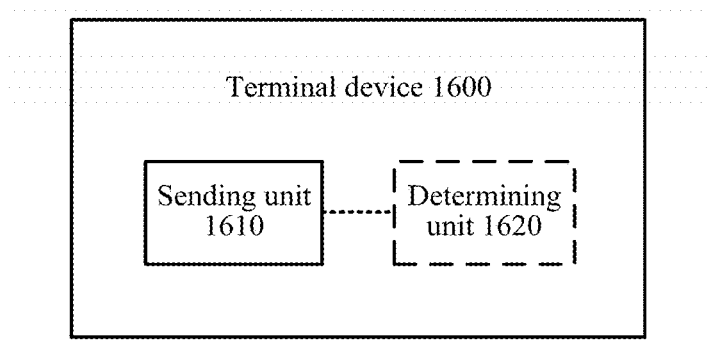
FIG. 16 is a schematic structural diagram of a terminal device according to another embodiment of this application.

FIG. 16 is a schematic structural diagram of a terminal device 1600 according to another embodiment of the present invention. As shown in FIG. 16, the terminal device 1600 includes a sending unit 1610.

The sending unit 1610 is configured to send at least one signal to a base station by using at least one uplink resource, and the at least one signal is used to indicate signal quality of a downlink resource.

The terminal device in this embodiment of this application sends, to the base station, the at least one signal used to indicate the signal quality of the downlink resource, so that the base station can learn of the signal quality of the downlink resource in time, and the base station can perform processing in time when a signal condition of the downlink resource does not satisfy a preset condition, thereby avoiding interruption of communication between the base station and the terminal device.

Optionally, the at least one signal carries indication information, and the indication information is used to indicate the signal quality of the downlink resource.

Optionally, each of the at least one signal carries same indication information.

Optionally, the at least one uplink resource occupied by the at least one signal is used to indicate the signal quality of the downlink resource. Optionally, the terminal device may further include a determining unit 1620, configured to: before the sending unit 1610 sends the at least one signal, determine the at least one uplink resource based on the signal quality of the downlink resource and a preconfigured correspondence, and the correspondence is a correspondence between the signal quality of the downlink resource and the uplink resource occupied by the signal sent by the terminal device.

Optionally, the at least one uplink resource includes at least one uplink beam, and the downlink resource includes a downlink beam.

Optionally, the at least one uplink resource further includes a time domain resource, a frequency domain resource, and/or a code domain resource corresponding to the at least one uplink beam, and the downlink resource further includes a time domain resource, a frequency domain resource, and/or a code domain resource corresponding to the downlink beam.

Optionally, when the sending unit 1610 sends the at least one signal to the base station by using the at least one uplink resource, an uplink beam is switched for every K symbols, and K is preconfigured.

Figure 17:
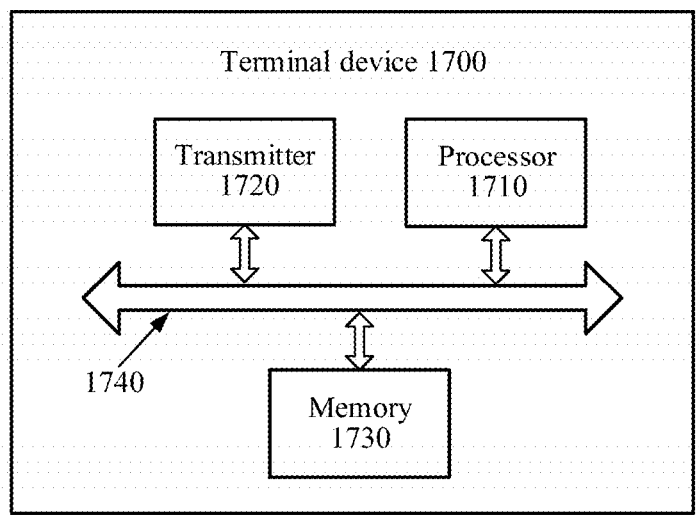
FIG. 17 is a schematic structural diagram of a terminal device according to another embodiment of this application.

FIG. 17 is a schematic structural diagram of a terminal device 1700 according to another embodiment of this application. As shown in FIG. 17, the terminal device 1700 includes a processor 1710, a transmitter 1720, a memory 1730, and a bus system 1740. All the components in the terminal device 1700 are coupled together by using the bus system 1740.

The memory 1730 may be configured to store code executed by the processor 1710 and the like. The transmitter 1720 is configured to send a signal under control of the processor 1710.

Specifically, the transmitter 1720 is configured to implement the function of the sending unit 1610. The processor 1710 is configured to implement the function of the determining unit 1620.

It should be understood that, the terminal device 1700 according to this embodiment of this application may correspond to the terminal device in the communication method 500 according to the embodiments of this application and the terminal device 1600 according to the embodiments of this application, and the foregoing and other operations and/or functions of the units in the terminal device 1700 are respectively used to implementing corresponding procedures of the method 500 shown in FIG. 5. For brevity, details are not described herein again.

It should be noted that, in addition to a data bus, the bus system in the foregoing embodiments may further include a power bus, a control bus, and a status signal bus. For ease of representation, all buses are marked as the bus system in the figure.

The memory in the foregoing embodiments may include a volatile memory (volatile memory), for example, a random-access memory (random-access memory, RAM), or the memory may include a non-volatile memory (non-volatile memory), for example, a flash memory (flash memory), a hard disk (hard disk drive, HDD), or a solid state drive (solid-state drive, SSD). The memory may further include a combination of the foregoing types of memories.

The processor in the foregoing embodiments may be a central processing unit (central processing unit, CPU), a network processor (network processor, NP), or a combination of a CPU and an NP. The processor may further include a hardware chip. The foregoing hardware chip may be an application-specific integrated circuit (application-specific integrated circuit, ASIC), a programmable logic device (programmable logic device, PLD), or a combination thereof. The foregoing PLD may be a complex programmable logic device (complex programmable logic device, CPLD), a field-programmable gate array (field-programmable gate array, FPGA), a generic array logic (generic array logic, GAL), or any combination thereof.

It should be understood that, the term "and/or" used in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with examples of units and algorithm steps described in the embodiments disclosed in this specification, this application may be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    receiving, by a terminal device, first indication information sent by a base station when determining that a signal quality of a current resource does not satisfy one or more conditions including the signal quality of the current resource decreased, the signal quality of the current resource interrupted, and a signal quality parameter less than a threshold, wherein the first indication information is used to instruct the terminal device to perform a first uplink transmission by using at least one configured resource, wherein the at least one configured resource comprises a resource that is different from a resource currently used by the terminal device;
    sending, by the terminal device, one or more signals to the base station by using one or more resources in the at least one configured resource according to the first indication information; and
    receiving, by the terminal device, third indication information sent by the base station, wherein the third indication information is used to instruct the terminal device to perform a second uplink transmission using a target resource selected from the one or more resources, wherein the at least one configured resource comprises at least one beam, and the target resource comprises a target beam.

2. The method according to claim 1, wherein the at least one configured resource further comprises one or more of a first time domain resource, a first frequency domain resource, and a first code domain resource corresponding to the at least one beam, and the target resource further comprises one or more of a second time domain resource, a second frequency domain resource, and a second code domain resource corresponding to the target beam.

3. The method according to claim 2, wherein the first indication information comprises beam indication information and resource configuration information, wherein the beam indication information is used to indicate the at least one beam, and the resource configuration information is used to indicate the first time domain resource, the first frequency domain resource, and the first code domain resource corresponding to the at least one configured resource.

4. The method according to claim 2, wherein before the receiving, by the terminal device, the first indication information sent by the base station, the method further comprises:
   receiving, by the terminal device, beam indication information and resource configuration information that are sent by the base station, wherein the beam indication information is used to indicate the at least one beam, and the resource configuration information is used to indicate the first time domain resource, the first frequency domain resource, and the first code domain resource corresponding to the at least one beam.

5. The method according to claim 1, wherein the one or more signals carry second indication information, wherein the second indication information is used to indicate that the terminal device does not use a remaining resource other than the one or more resources in the at least one configured resource to perform the first uplink transmission.

6. A base station, comprising:
   a processor; and
   a memory coupled to the processor to store instructions, which when executed by the processor, cause the processor to perform operations, the operations including:
   sending first indication information to a terminal device when determining that a signal quality of a current resource does not satisfy one or more conditions including a signal quality parameter less than a threshold, wherein the first indication information is used to instruct the terminal device to perform a first uplink transmission by using at least one configured resource, wherein the at least one configured resource comprises the resource that is different from a resource currently used by the terminal device;
   receiving one or more signals sent by the terminal device by using one or more resources in the at least one configured resource according to the first indication information; and
   sending third indication information to the terminal device, wherein the third indication information is used to instruct the terminal device to perform a second uplink transmission using a target resource selected from the one or more resources, wherein the at least one configured resource comprises at least one beam, and the target resource comprises a target beam.

7. The base station according to claim 6, wherein the at least one configured resource further comprises one or more of a first time domain resource, a first frequency domain resource, and a first code domain resource corresponding to the at least one beam, and the target resource further comprises one or more of a second time domain resource, a second frequency domain resource, and a second code domain resource corresponding to the target beam.

8. The base station according to claim 7, wherein the first indication information comprises beam indication information and resource configuration information, wherein the beam indication information is used to indicate the at least one beam, and the resource configuration information is used to indicate the first time domain resource, the first frequency domain resource, and the first code domain resource corresponding to the at least one beam.

9. The base station according to claim 7, the operations further including:
   before sending the first indication information to the terminal device, sending beam indication information and resource configuration information to the terminal device, wherein the beam indication information is used to indicate the at least one beam, and the resource configuration information is used to indicate the first time domain resource, the first frequency domain resource, and the first code domain resource corresponding to the at least one beam.

10. The base station according to claim 6, wherein the one or more signals carry second indication information, wherein the second indication information is used to indicate that the terminal device does not use a remaining resource other than the one or more resources in the at least one configured resource to perform the first uplink transmission.

11. A terminal device, comprising:
   a processor; and
   a memory coupled to the processor to store instructions, which when executed by the processor, cause the processor to perform operations, the operations including:
   receiving first indication information sent by a base station when determining that a signal quality of a current resource does not satisfy one or more conditions including a signal quality parameter less than a threshold, wherein the first indication information is used to instruct the terminal device to perform a first uplink transmission by using at least one configured resource, wherein the at least one configured resource comprises a resource that is different from a resource currently used by the terminal device;
   sending one or more signals to the base station by using one or more resources in the at least one configured resource according to the first indication information; and
   receiving third indication information sent by the base station, wherein the third indication information is used to instruct the terminal device to perform a second uplink transmission using a target resource selected from the one or more resources, wherein the at least one configured resource comprises at least one beam, and the target resource comprises a target beam.

12. The terminal device according to claim 11, wherein the at least one configured resource further comprises one or more of a first time domain resource, a first frequency domain resource, and a first code domain resource corresponding to the at least one beam, and the target resource further comprises one or more of a second time domain resource, a second frequency domain resource, and a second code domain resource corresponding to the target beam.

13. The terminal device according to claim 12, wherein the first indication information comprises beam indication information and resource configuration information, wherein the beam indication information is used to indicate the at least one beam, and the resource configuration information is used to indicate the first time domain resource, the first frequency domain resource, and the first code domain resource corresponding to the at least one configured resource.

14. The terminal device according to claim 12, the operations further including:
   before receiving the first indication information, receiving beam indication information and resource configuration information that are sent by the base station, wherein the beam indication information is used to indicate the at least one beam, and the resource configuration information is used to indicate the first time domain resource, the first frequency domain resource, and the first code domain resource corresponding to the at least one beam.

15. The terminal device according to claim 11, wherein the one or more signals carry second indication information, wherein the second indication information is used to indicate that the terminal device does not use a remaining resource other than the one or more resources in the at least one configured resource to perform the first uplink transmission.

16. The method according to claim 1, further comprising:
   sending, by the terminal device, a second uplink transmission using a target resource.

17. The terminal device according to claim 11, the operations further including:
   sending a second uplink transmission using a target resource.

* * * * *